July 24, 1962 N. J. MURPHY 3,046,341

POSTPAY PAYSTATION CIRCUIT PROVIDING SPECIAL SERVICE

Filed June 6, 1960 2 Sheets-Sheet 1

INVENTOR.
Norbert J. Murphy
BY C. A. Sullivan
Atty.

July 24, 1962 N. J. MURPHY 3,046,341

POSTPAY PAYSTATION CIRCUIT PROVIDING SPECIAL SERVICE

Filed June 6, 1960 2 Sheets-Sheet 2

INVENTOR.
Norbert J. Murphy
BY C. A. Gulbrandsen
Atty.

United States Patent Office 3,046,341
Patented July 24, 1962

3,046,341
POSTPAY PAYSTATION CIRCUIT PROVIDING SPECIAL SERVICE

Norbert J. Murphy, Chicago, Ill., assignor to Automatic Electric Laboratories, Inc., Northlake, Ill., a corporation of Delaware Filed June 6, 1960, Ser. No. 34,174
3 Claims. (Cl. 179—6.3)

The present invention relates to telephone systems in general and more specifically to telephone paystations of the postpay, or reverse battery type having improved coin controlled circuits and apparatus particularly adapted for use therein.

As applied to postpay telephone paystations, the primary object of my invention is to provide a simple, economical and improved paystation circuit arranged for use with a postpay telephone paystation, whereby talking connections between a calling paystation and a called subscriber are established in an efficient, reliable and satisfactory manner.

Another object of the invention is to provide an improved postpay type paystation, whereby if the paystation is located in a direct toll dialling area, the paystation user has unlimited access to the line for establishing and completing local connections both to local subscribers and to the operator, but is automatically prevented from establishing a direct toll dialling connection without operator assistance.

Referring to U.S. Patent 1,383,472, issued July 5, 1921, to G. A. Long, it wil be noted that this patent may be taken as one disclosure of a standard automatic paystation telephone showing the normal equipment therein and requiring the deposit of a coin of a certain denomination as the usual established fee for all local calls. This standard paystation telephone has individual thereto the conventional coin chute, coin hopper, coin trigger, polarized relay, contact mechanism associated with the coin trigger and relay, receiver, transmitter and coin operated signal.

When the above-mentioned standard paystation of Long is used as a postpay or reverse battery type, the circuit and apparatus thereof is modified along the lines somewhat similar to that shown in U.S. Patent 1,844,684, issued February 9, 1932, to T. C. Riebe, wherein the structure and standard operations of a postpay type paystation are believed to be adequately described.

Subsequent to the issuing of the above-mentioned patents to Long and Riebe, changing economic conditions resulting in rising costs forced the telephone companies to increase their fee for local calls. This fee increase caused resulting modifications to be made to the mechanisms and circuits of the paystations disclosed in the above-mentioned Long and Riebe patents. Specific ones of these modifications are reflected in U.S. Patent 2,674,655, issued April 6, 1954, to Ray John Gallagher, wherein a mechanism was adapted for use with paystations requiring the deposit of two nickels as the fee for a local call, and in U.S. Patent 2,706,551, issued April 19, 1955, to Ray John Gallagher, wherein a mechanism was adapted for use with paystations requiring the deposit of a single dime as the fee for a local call.

As disclosed in my invention, the above-described postpay station coin controlled actuating mechanism and circuit such as disclosed in the patent to Riebe has been further modified to include additional equipment and will function with either of the two cited Gallagher patents to provide the special service described in detail later on in this specification.

In general, a postpay paystation operates as follows for a local call:

The party at the calling paystation removes his receiver to complete the loop circuit and dials the call number of the desired party to establish connections therebetween. Responsive to answering by the called party, reverse battery polarity is transmitted back to the calling paystation. This reverse battery polarity causes the operation of the polarized coin magnet at the calling paystation, which in turn closes contacts to shunt the transmitter for preventing conversation until the required fee has been deposited. A deposited coin or coins, the total value of which must at least equal the required fee, operates the coin trigger, which causes the closed contacts to be opened to remove the shunt from the transmitter and allow normal conversation to take place.

In accordance with the previously named objects, a feature of the present invention relates to the provision of means in the paystation circuit, whereby the pulsing contacts of the dial are rendered ineffective in response to receipt of reverse battery polarity over a connection.

Another feature of the invention relates to the provision of means in the paystation, whereby the transmitter and receiver is rendered ineffective in response to receipt of reverse battery polarity over a connection simultaneous with the above-mentioned pulsing contacts being rendered ineffective.

A further feature of the invention relates to first and second coin actuated means operated by a deposited coin for rendering the above-mentioned transmitter and receiver effective and for shunting the operate and restoring coils, or sections, of the polarized coin magnet.

A still further feature of the invention relates to means at the paystation for applying a high circuit resistance to a certain connection having a reverse battery polarity applied thereto to cause the certain connection to restore to a particular point where normal battery polarity is subsequently applied to the connection.

The novel features believed to be characteristic of the invention are set forth with particularity in the appended claims, while the invention both as to its organization and method of operation, together with further objects and advantages thereof, will best be understood by reference to the following detailed operational description taken in conjunction with the accompanying drawings comprising FIGS. 1, 2 and 3 which show, by means of the usual circuit diagrams, a sufficient amount of apparatus to enable the invention to be described and understood and in which:

It will be again pointed out that this is a schematic representation and is not intended to be an accurate mechanical representation.

In its preferred form, such as disclosed in the present application, a brief general description of the invention will now be given.

*General Description*

Figure 1:
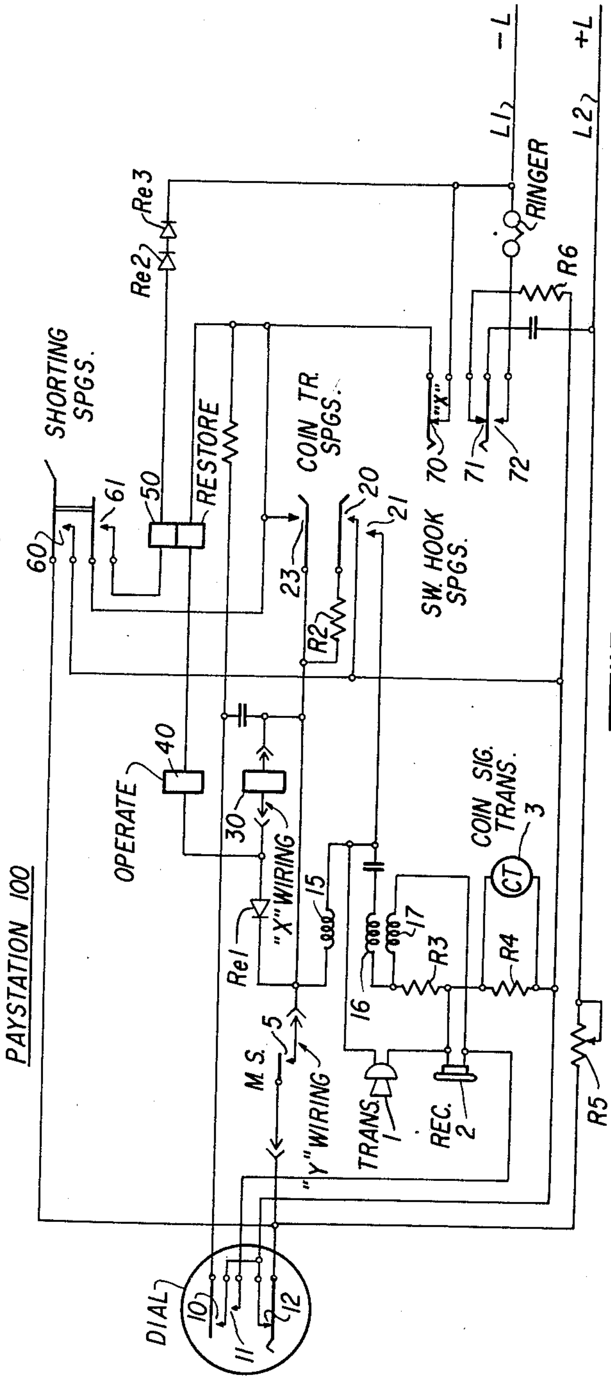
FIG. 1 is a schematic representation of the paystation circuit embodying the invention and showing the component parts and their interior relationship.
Figure 2:
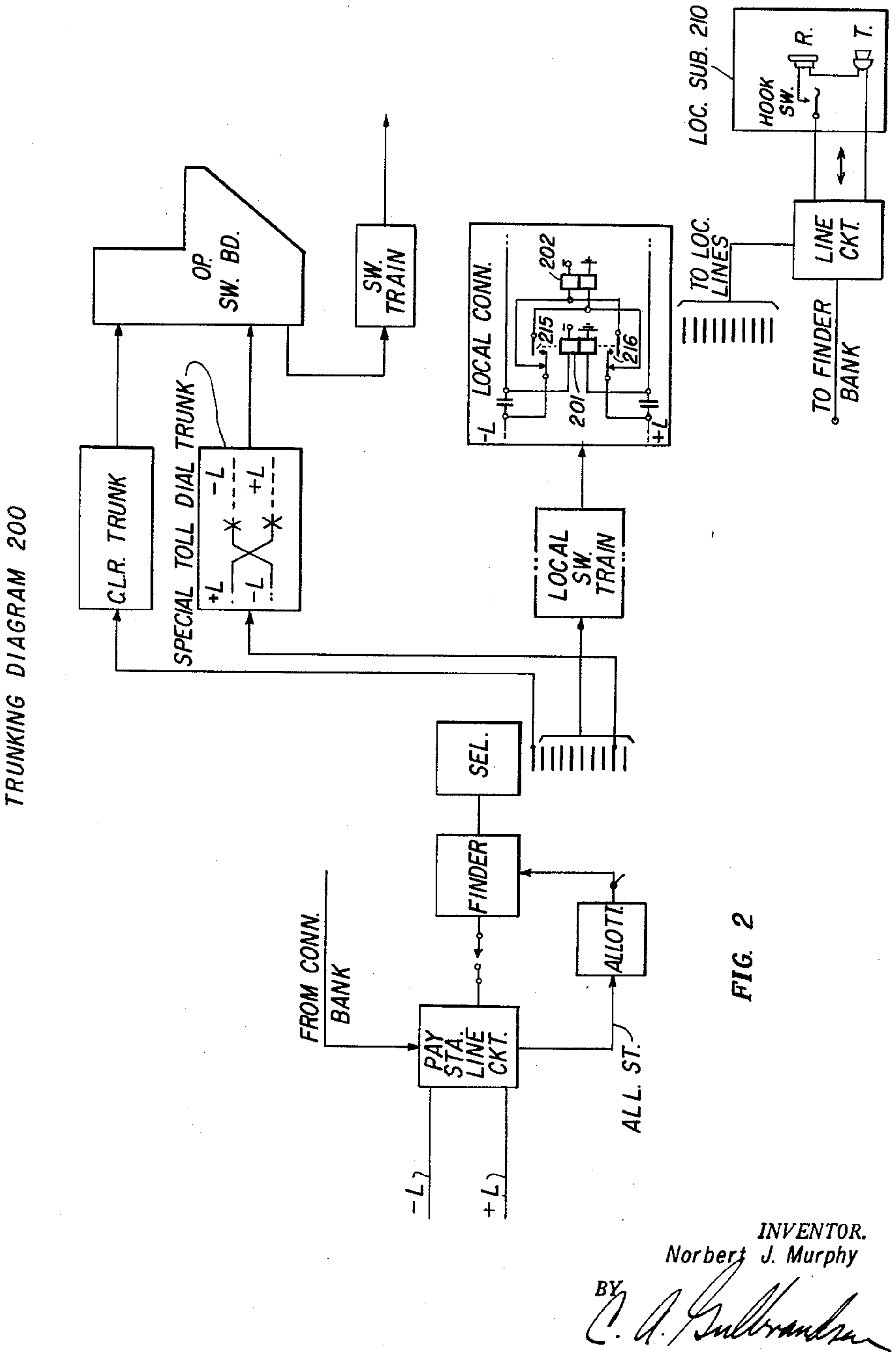
FIG. 2 represents a typical trunking diagram showing one method of a practical application of the invention in a telephone system, with block diagrams representing standard equipment which may be of any well-known type and which operate in a well-known manner.

Referring in particular to FIG. 1 showing the apparatus of the paystation 100 and to FIG. 2 showing the trunking diagram 200, it will be appreciated that the line circuit individual to paystation 100 will function with any type of well-known telephone switching equipment. However, for the purpose of the present description, it will be assumed that the finder-selector link, the local switch train and the local connector (all of which are shown in block diagram) may be of the well-known Strowger step-by-step type, with the function of same being well-known in the art. It will also be assumed that the combined line and recording (hereinafter referred to as CLR) trunk and the special toll dial trunk leading to the operator's switchboard at the central office also function in a well-known manner. It will be further noted that the special toll dial trunk is arranged in a well-known manner providing means for reversing the battery polarity to the line conductors leading to the selector banks at the time of seizure. It will further be noted that the local connector such as shown in block diagram provides means for reversing the polarity of the battery potential to be applied to the switch train leading to the selector in response to the answering of a call by the local subscriber. This type of battery reversing connector is well-known in the art and is disclosed in detail in FIG. 2 of U.S. Patent 1,889,-229, granted November 29, 1932, to V. S. Tharp.

Referring to paystation 100 of FIG. 1, it will be seen that "X" wiring is provided including the nickel rejector, or microswitch reset, magnet 30 and "Y" wiring is provided including the microswitch contact 5. It will be appreciated that if paystation 100 is to be used with the dime only mechanism of the above-cited Gallagher Patent 2,706,551, the "X" wiring and apparatus will be used, while if the paystation is to be used with the two nickel mechanism of the other above-cited Gallagher Patent 2,674,655, both the "X" and "Y" wiring and apparatus will be used. It will be further appreciated that paystation 100 can function without either the "X" or the "X" and "Y" wiring and apparatus.

If paystation 100 desires to call a local subscriber such as 210, the removal of the handset from the hookswitch closes "X" contacts 70 to complete a loop circuit to the paystation line circuit shown in FIG. 2. Equipment (not shown) in the line circuit causes the allotter to start an idle finder to hunt for and connect with the calling line circuit in a well-known manner. At this time, paystation 100 receives dial tone from the finder-selector link and dials the call number of local subscriber 210. The finder-selector link, the local switch train and the local connector operate in response to dialling in a well-known manner to extend a signalling connection to local subscriber 210. The local connector is operated in a manner such as described in the above-mentioned Tharp patent in response to answering by local subscriber 210 for applying reverse battery polarity to the connection extending back to the paystation. The operate coil 40 of the coin magnet at paystation 100 operates in response to receipt of this reverse polarity for applying a shunt across transmitter 1 and receiver 2 to render them ineffective until a suitable coin has been deposited. The deposit of the proper coin removes the shunt from transmitter 1 and receiver 2 so that conversation may thereafter take place. The deposit of the coin also places a shunt across the operate and restore coil sections of the coin magnet to improve voice transmission. At the end of conversation and responsive to the calling and called parties replacing their receivers, the polarity of the battery potential is restored to normal in a well-known manner and restoring coil 50 of the coin magnet operates to restore the operated contacts and equipment to normal.

If the party at paystation 100 desires to extend a connection to the operator at the central office switchboard, the finder connects with the line of the paystation in a well-known manner and the finder-selector link is thereafter operated in response to the dialling of the single digit such as 0 for extending the connection by way of the CLR trunk to the operator at the switchboard. The polarity of battery is not reversed over the connection for this type of call so that the transmitter 1 and receiver 2 are still effective and in this way conversation may take place between paystation 100 and the operator. The operator thereafter extends the toll connection to the desired party and after informing the calling party of the proper toll fee and ascertaining that it has been deposited, completes the talking connection so that conversation may take place.

Since it is assumed that paystation 100 is located in a direct toll dialling area, a calling party at the paystation may attempt to extend a toll call without the assistance of the operator. However, as the toll area access number must first be dialled when a toll call is initiated, the associated finder-selector link is operated in response to the dialling of this toll access number for extending a connection to the special toll dial trunk. It will be noted that as soon as the selector extends this connection to the special toll dial trunk, the polarity of the battery potential is automatically reversed to this connection for energizing the operate coil 40 of the coin magnet to cause coil 40 to operate as previously mentioned to shunt transmitter 1, receiver 2 and the impulsing springs of the dial, whereby conversation is prevented and the dial is ineffective for further pulsing. Under these circumstances, the deposit of a coin will remove the shunt from the transmitter 1 and receiver 2, but will not render the dial impulsing springs effective.

Having briefly described the invention, a detailed operational description will now be given for each specific type of practical application.

*Local Call*

During this section of the operational description, it will be assumed that a calling party at paystation 100 desires to extend a call to a local subscriber such as 210. Reference will hereafter be had in detail with FIGS. 1 and 2, wherein it will be noted that as the calling party at paystation 100 removes his handset from the hookswitch, "X" contacts 70 are closed for extending the loop circuit to the paystation line circuit and for preparing a point in the talking circuit at the hookswitch contacts 71. This loop circuit may be traced as extending from a ground potential (not shown) in the line circuit through a winding of the line relay (not shown) therein, the +L line conductor, the line compensating resistance R5, dial impulsing springs 12, the coin signal transmitter 3, the regular transmitter 1, the primary winding 15 of the induction coil, the nickel rejector or microswitch magnet 30, operate coil 40 of the coin magnet, the bottom winding of restoring coil 50 of the coin magnet, "X" contacts 70 of the hookswitch, the −L line conductor and through a winding of the line relay (not shown) in the line circuit to a battery potential (not shown) therein. It will be pointed out at this time that neither the operate coil 40 nor the restoring coil 50 of the coin magnet will operate over the above traced loop circuit, since this coin magnet is a polarized magnet and the windings are such that the effect of one cancels the effect of the other.

Although not shown, the line relay in the line circuit operates to start the allotter in a well-known manner. The allotter thereafter causes an idle finder of a finder-selector link to hunt for and connect with the calling paystation line. At this time, dial tone is returned over the connection to paystation 100 in a well-known manner to indicate to the calling party thereat that dialling may commence. The call number of local subscriber 210 is dialled and dial pulses are transmitted to the finder-selector link to cause the selector to extend the connection into the local switch train where the connection is further extended by means of additional dial pulses to the local connector, all in a well-known manner. The local connector is thereafter operated responsive to receipt of impulses corresponding to the final dialled digits for extending the connection to signal local subscriber 210 also in a well-known manner.

The local connector operates in a manner such as described in the previously cited Tharp patent in response to answering of the call by local subscriber 210 for reversing the polarity of battery potential applied to the line conductors of the connection extending back to paystation 100.

With the above-mentioned reversal of battery polarity applied to the line conductors leading to paystation 100, the reverse current flow thereat may be traced as extending from ground potential through the lower winding of relay 202 of the local connector, the armature 215 (relay 201 operates responsive to answering) and engaged make contact, over the —L line conductor of the connection and the associated switch train to the —L conductor of paystation 100, "X" contacts 70 of the hookswitch, the bottom winding of restoring coil 50 of the coin magnet, the operate coil 40 of the coin magnet, rectifier RE1, primary winding 15 of the induction coil, transmitter 1, coin signal transmitter 3, the dial impulsing springs 12, line compensating resistance R5, the +L line conductor of the connection to the +L line conductor of the local connector, armature 216 and engaged make contact and through the upper winding of relay 202 to battery.

The energization of the operate coil 40 of the coin magnet is effective in response to receipt of reversed current flow over the above-traced circuit to operate the common stay put type armature of the coin magnet to operate the coin trigger shunting springs and close contacts 20 and 21, and to also close contacts 60 and 61. The closing of the coin trigger shunting contacts 20 and 21 shunts the primary winding 15 of the induction coil and the transmitter 1 and receiver 2, whereby conversation cannot take place, while the combined closing of contacts 20 and the closing of contacts 60 shunts the dial pulsing contacts 12, the complete induction coil, transmitter 1, receiver 2, and the coin signal transmitter 3. At this stage of the operational description it will be noted that paystation 100 is entirely ineffective and will remain so until a suitable coin deposit is made thereat by the calling party.

The coin trigger operates in a well-known manner responsive to the deposit of the required fee, whereby the coin trigger shunting springs are actuated by the coin to open contacts 20 and 21 and close contacts 23. The opening of contacts 20 and 21 removes the shunt from the primary winding of the induction coil and the transmitter 1 and receiver 2, while the closing of contacts 23 completes an obvious shunt of the restoring coil 50 and operates coil 40 of the coin magnet and also shunts rectifier RE1. This last-mentioned shunt circuit completed by contacts 23 obviously improves the talking circuit.

It will be noted that the previously mentioned closing of contacts 61 in response to the operation of the operate coil 40 prepared a point in the future energizing circuit of the upper winding of the restore coil 50. It will be appreciated that conversation between the calling party at paystation 100 and the local subscriber 210 may now take place, since the proper coin deposit has been made to free the apparatus thereat for subsequent conversation.

In response to the calling party at paystation 100 replacing his receiver on the hookswitch at the end of conversation, the "X" contacts 70 and contacts 71 are opened, while contacts 72 are closed. The opening of "X" contacts 70 now includes the upper winding of restore coil 50 in the above-traced reverse battery polarity circuit. Restore coil 50 does not operate over this present circuit since the rectifiers RE2 and RE3 offer a very high resistance to any current passage thereover.

When the called local subscriber 210 replaces his receiver, the local connector releases and restores the battery polarity to normal in a well-known manner. The rectifiers RE2 and RE3 are therefore conductive responsive to receipt of this normal battery polarity, whereby the upper winding is energized and restore coil 50 of the coin magnet thereupon operates. This operating circuit for restore coil 50 may be traced as extending from the ground applied to the +L line conductor of the connection as previously described, the line compensating resistance R5, the dial impulse springs 12, the coin signal transmitter 3, transmitter 1, primary induction coil winding 15, the winding of relay 30, the winding of operate coil 40, the bottom winding of restore coil 50, contacts 61, the upper winding of restore coil 50, rectifiers RE2 and RE3 and out over the —L line conductor to the battery potential as previously described.

Upon energizing, restore coil 50 of the coin magnet operates the common stay-put armature to restore the coin trigger spring contacts 23 to normal and to further restore contacts 60 and 61 to normal. The opening of contacts 61 and coin trigger contacts 23 opens the above-traced energizing circuit of restore coil 50, whereby this coil now releases. At this stage of the operational description, all of the equipment in paystation 100 is restored to normal and the paystation is conditioned to handle future calls.

*Direct Dial Toll Call*

Reference will be had with FIGS. 1 and 2 of the drawings during the above-entitled type of call, wherein it will be assumed that a calling party at paystation 100 will attempt to dial a toll call direct from the paystation.

It will be appreciated that responsive to the party at paystation 100 removing the receiver, the finder portion of the finder-selector link shown in FIG. 2 operates to find and connect the calling line, and that dial tone is extended back to the paystation all as previously described.

As it has been previously mentioned that paystation 100 is in a direct toll dial area, it is necessary that the toll call number of the desired party be prefixed with the toll access number and that this access number be dialed first. Therefore, the selector portion of the local finder-selector link is operated in a well-known manner in response to the dialling of this toll access number. At the time that the selector wipers engage the bank contacts terminating the conductors leading from the special toll dial trunk, an immediate and obvious reversal of battery polarity takes place responsive to the trunk being seized. It will be appreciated that while the means in the CLR toll dial trunk for reversing the battery polarity has not been shown in detail, it may be accomplished in any well-known manner.

The equipment at paystation 100 operates responsive to receipt of the reverse battery polarity from the special toll dial trunk in the same manner as described in the previous section entitled "Local Call," wherein transmitter 1, receiver 2 and the dial impulse springs 12 are shunted as described. Further dialling is hereafter prevented and in the event that a coin is deposited in an attempt by the calling party to continue dialling, the coin deposit will open trigger contacts 20 and 21 and close contacts 23 to remove the shunt from transmitter 1 and receiver 2, but will still leave the shunt across the dial impulsing springs 12 to prevent further dialling at this time, thereby insuring toll operator supervision on all toll calls from the paystation.

It is assumed upon failure to extend the toll call and that after a reasonable length of time, the calling party at paystation 100 will replace his receiver on the hookswitch, thereby opening "X" contacts 70 to include the high resistances of rectifiers R2, R3 and the resistance of the upper winding of restore coil 50 in the existing loop circuit. This total high resistance causes the special toll dial trunk at the central office to release in a well-known manner by causing the line relay (not shown) therein to restore, whereby the finder-selector link returns battery of normal polarity to the paystation to operate restore coil 50 of the coin magnet in the same manner as previously described to restore the equipment in paystation 100 to normal. The paystation 100 is now at normal and conditioned to handle future calls.

*Toll Call Completed by Operator*

During this section of the operational description, it will be assumed that a calling party at paystation 100 desires to place a regular toll call, wherein it will be extended and completed by the operator at the central office switchboard. Reference will hereinafter be had in detail with FIGS. 1 and 2. The calling party at paystation 100 initiates a call in the same manner as previously described in the section entitled "Local Call," wherein the finder portion of an idle finder-selector link is operated to hunt for and connect with the calling line. At this time, as previously described, dial tone is returned over the connection to the paystation 100 from the finder-selector link to indicate to the calling party that dialling may thereafter commence. For this type of call it will be assumed that the single digit "0" is dialled by the calling party at paystation 100, whereby the selector portion of the finder-selector link is operated to extend the connection for seizing the CLR trunk at the central office switchboard. The CLR trunk operates in a well-known manner responsive to seizure to signal the operator who thereafter answers the incoming call. It will be appreciated that for this type of a call, the battery polarity to the connection is not reversed at the time that the operator answers, whereby transmitter 1 and receiver 2 of paystation 100 are effective for allowing conversation to take place with the operator.

The operator, upon receiving sufficient information from the calling party at paystation 100, extends the toll call to the desired party and after determining that the calling party has deposited a sufficient amount of toll, completes the talking connection.

Figure 3:
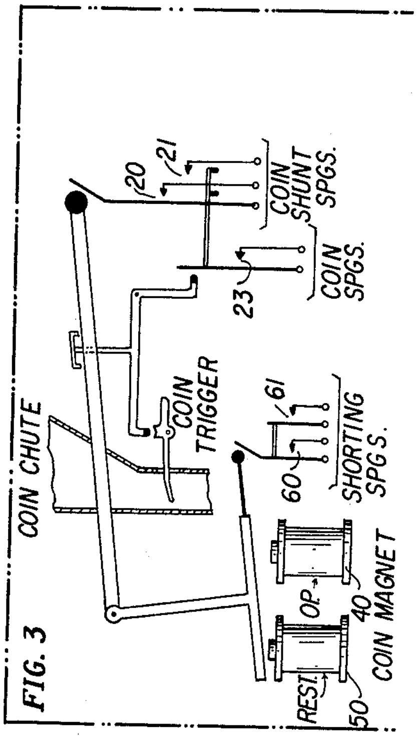
FIG. 3 is a schematic representation showing the relationship between the operate section and the restoring section of the polarized coin magnet, the common stay-put type armature, the contacts controlled thereby, and the contacts controlled by the coin trigger.

It will be pointed out that the coin deposit during this type of call has no effect on the coin trigger spring contacts 20, 21 and 23. Reference to FIG. 3 discloses that with the common stay-put armature of the coin magnet in its normal position as shown, the actuating arm normally operated by the coin trigger is held in the position whereby the roller located toward the coin chute end is maintained out of engagement with the coin trigger. In this manner, deposited coins will rotate only the coin trigger and will not trip the actuating arm to thereby operate the associated contacts.

Therefore, since battery is not reversed and since no apparatus at paystation 100 has been operated during this type of call other than the hookswitch contacts, the replacing of the receiver on the hookswitch at the end of conversation opens "X" contacts 70 and closes contacts 72 to restore the paystation and its associated circuits to normal.

Paystation 100 is now at normal and conditioned to handle future calls.

Having described my invention and what is considered new and desired to have protected by Letters Patent will be pointed out in the appended claims.

What is claimed is:

1. In a direct toll dialling telephone system wherein call numbers of toll subscribers are prefixed by a toll dialling area number, the combination therewith including a line having a paystation subscriber thereon, a finder-selector link, a normally incomplete loop circuit individual to said paystation line, hookswitch means in said paystation operated in response to the initiation of a call by said associated subscriber for completing said loop circuit, an impulsing circuit including a portion of said loop circuit and sad paystation line, means operated in response to said completion of said loop circuit for operating the finder portion of said link to hunt for and connect with said calling paystation line over said loop circuit, a special trunk circuit having normally reversed line conductors, a dial in said impulsing circuit operated by said calling paystation subscriber for directively controlling the selector portion of said link over said impulsing circuit to automatically extend a connection to said reversed line conductors of said special trunk circuit only in response to the dialling of said prefix toll dialling area number and before the remainder of a toll subscriber call number is dialled, and disabling means in said paystation operated in response to said extension of said connection to said reversed line conductors of said special trunk circuit for disabling said impulsing circuit to subsequent dialling of said remainder of said toll subscriber call number.

2. An arrangement such as claimed in claim 1, wherein said disabling means includes a normally ineffective dial shunting circuit, an electromagnet in said loop circuit operated in response to said extension of said connection to said reversed line conductors of said special trunk circuit, and contacts in said dial shunting circuit controlled by said operation of said electromagnet for completing said dial shunting circuit to shunt said dial from said impulsing circuit, whereby said impulsing circuit is disabled.

3. A direct toll dialling telephone system such as set forth in claim 1, including high resistance means at said paystation normally excluded from said loop circuit, said hookswitch means restored in response to said associated paystation subscriber abandoning said initiated call for connecting said high resistance means in said completed loop circuit, said special trunk circuit restored to normal in response to said connection of said high resistance in said loop circuit for releasing from said extended connection, and means in said paystation operated in response to said release of said special trunk circuit from said connection for restoring said loop circuit to normal.

References Cited in the file of this patent

UNITED STATES PATENTS

| | | |
|---|---|---|
| 2,041,964 | Sandalls | May 26, 1936 |
| 2,248,575 | Lomax | July 8, 1941 |
| 2,820,847 | King | Jan. 21, 1958 |